United States Patent Office 3,575,965
Patented Apr. 20, 1971

3,575,965
PROCESS FOR THE PREPARATION OF 11-CHLORO-8,12b-DIHYDRO - 2,8 - DIMETHYL-12b-PHENYL-4H - [1,3]OXAZINO[3,2-d] [1,4]BENZODIAZEPINE-4,7 (6H)-DIONE
Jacob Szmuszkovicz, Kalamazoo, Mich., assignor to The Upjohn Company, Kalamazoo, Mich.
No Drawing. Filed Oct. 20, 1969, Ser. No. 867,936
Int. Cl. C07d 87/54, 53/06
U.S. Cl. 260—239.3                           3 Claims

ABSTRACT OF THE DISCLOSURE

A process for the preparation of 11-chloro-8,12b-dihydro - 2,8 - dimethyl - 12b - phenyl - 4H - [1,3]oxazino [3,2-d][1,4]benzodiazepine - 4,7(6H) - dione. This compound is useful as a tranquilizer and sedative for animals, including mammals.

BRIEF SUMMARY OF THE INVENTION

The novel process for the preparation of 11-chloro-8, 12b - dihydro - 2,8 - dimethyl - 12b - phenyl - 4H-[1,3] oxazino[3,2-d][1,4]benzodiazepine - 4,7(6H) - dione is illustrated by the following equation.

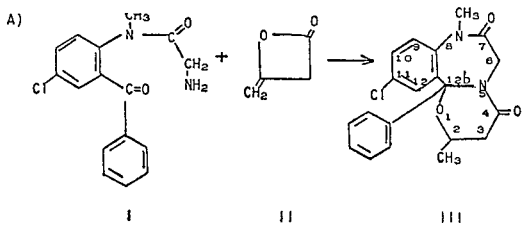

DETAILED DESCRIPTION

The novel process involves reacting 2-(2-amino-N-methylacetamido-5-chlorobenzophenone (I) with diketene at a temperature of about 40–95° C., preferably about 50–75° C., for a period of about 1 to 24 hours, preferably about 3 to 5 hours. The molar ratio of diketene to 2-(2-amino-N-methylacetamido)-5 - chlorobenzophenone can vary from about 5:1 to 50:1, and preferably is about 25:1. Although the reaction can be conducted without a solvent, the preferred embodiment involves the use of an inert ketonic solvent, preferably acetone. The use of acetone at its reflux temperature (about 56° C.) provides excellent reaction conditions. Other ketonic solvents that can be used include 2-pentanone, 3-pentanone, 2-butanone, etc. The ratio of solvent to diketene can vary from about 1:2 to 2:1 by weight, preferably about 1:1 by weight.

The starting material, 2-(2-amino-N-methylacetamido)-5-chlorobenzophenone, used in Process A can be prepared by a process illustrated by the following flow scheme:

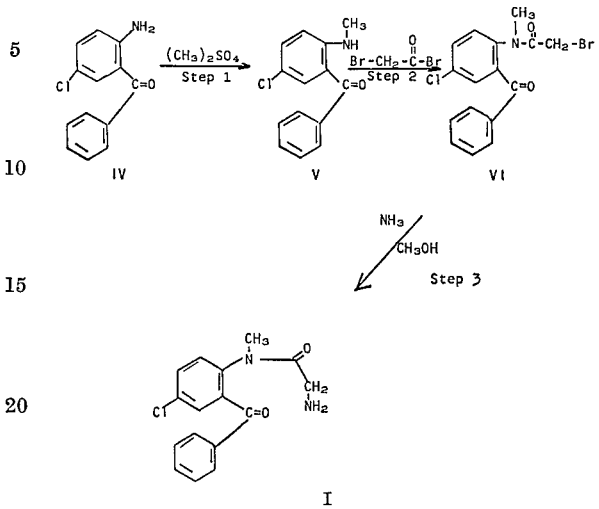

Step 1 involves reacting 2-amino-5-chlorobenzophenone (IV) with dimethyl sulfate to yield 5-chloro-2-(methylamino)benzophenone (V). The conditions and parameters of this process are described in detail by Podesva et al., Can. J. Chem. 46, 435 (1968).

In step 2, 5-chloro-2-(methylamino)benzophenone is reacted with bromoacetyl bromide in accordance with a method described by Sternbach et al., J. Org. Chem. 27, 3788 (1962) (see method D) to give 2-(2-bromo-N-methylacetamido)-5-chlorobenzophenone (VI).

Step 3 involves reacting 2-(2-bromo-N-methylacetamido)-5-chlorobenzophenone with a methanolic solution of ammonia at a temperature of about 20–30° C. and a reaction time of about 1 to 24 hours to give 2-(2-amino-N - methylacetamido) - 5-chlorobenzophenone (1). The molar ratio of VI to ammonia can vary from about 1:10 to 1:200, and preferably is about 1:100. The compound I can be recovered from the reaction mixture by conventional methods such as crystallization, evaporation, chromatography and the like. A method for the preparation of compound I is also disclosed in French Patent 1,329,-160 and Swiss Patent 408,045.

The novel compound of this invention (III) is useful as a sedative and tranquilizer for animals, including mammals.

The following example is set forth to illustrate the invention and to enable persons skilled in the art to understand and practice the invention and is not intended to limit the same.

Example.—Preparation of 11-chloro-8,12b-dihydro-2,8-dimethyl - 12b - phenyl - 4H - [1,3]oxazino[3,2-d] [1,4]benzodiazepine-4,7(6H)-dione A solution of 0.7 g. of 2-(2-amino-N-methylacetamido)-5-chlorobenzophenone in 10 ml. of a 50% solution (by weight) of diketene in acetone is refluxed for 3 hours and then evaporated to give a brown oil. The oil is chromatographed on 200 g. of silica gel using a 1:1 (by volume) mixture of ethyl acetate cyclohexane; 25-ml. fractions are collected. Fractions 11-14 are combined, mixed with chloroform, evaporated and triturated with ether to give 0.337 g. of 11-chloro-8,12b-dihydro-2,8-dimethyl - 12b - phenyl - 4H - [1,3]oxazino[3,2-d][1,4] benzodiazepine-4,7(6H)-dione as a pale yellow solid, melting point 174-176° C.

What is claimed is:
1. A process for preparing 11-chloro-8,12b-dihydro-2, 8 - dimethyl - 12b - phenyl - 4H-[1,3]oxazino[3,2-d][1,4] benzodiazepine-4,7(6H)-dione which comprises reacting a compound having the formula:

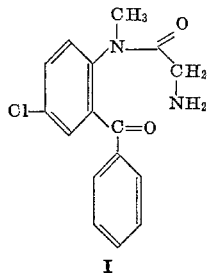

I with diketene wherein the temperature is from about 40-95° C., the reaction time is from about 1 to 24 hours and the molar ratio of diketene to I is from about 5:1 to 50:1.

2. A process of claim 1 conducted in the presence of a ketonic solvent.

3. A process of claim 2 wherein the temperature is 56° C., the molar ratio of diketene to I is about 25:1, the solvent is acetone, the reaction time is about 3 hours and the ratio of ketone to diketene is about 1:1 by weight.

References Cited

UNITED STATES PATENTS 3,419,547  12/1968  Schmutz et al. _____ 260—239.3

HENRY R. JILES, Primary Examiner

R. T. BOND, Assistant Examiner

U.S. Cl. X.R.

260—999